(12) United States Patent
Ilyadis et al.

(10) Patent No.: US 10,594,580 B2
(45) Date of Patent: Mar. 17, 2020

(54) NETWORK FUNCTION VIRTUALIZATION MANAGEMENT SYSTEM

(71) Applicant: Avago Technologies International Sales Pte. Limited, Singapore (SG)

(72) Inventors: Nicholas Ilyadis, Merrimack, NH (US); Xuemin Chen, San Diego, CA (US); Philippe Klein, Jerusalem (IL); Mohan Venkatachar Kalkunte, Saratoga, CA (US); Glen Kramer, Petaluma, CA (US); Kumaran David Siva, Palo Alto, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 548 days.

(21) Appl. No.: 14/839,508

(22) Filed: Aug. 28, 2015

(65) Prior Publication Data
US 2017/0041201 A1 Feb. 9, 2017

Related U.S. Application Data

(60) Provisional application No. 62/200,612, filed on Aug. 3, 2015.

(51) Int. Cl.
*G06F 15/16* (2006.01)
*H04L 12/26* (2006.01)
*H04L 12/24* (2006.01)

(52) U.S. Cl.
CPC ............ *H04L 43/08* (2013.01); *H04L 41/048* (2013.01); *H04L 41/5045* (2013.01); *H04L 43/50* (2013.01)

(58) Field of Classification Search
CPC ...................................................... H04L 43/08
USPC ......................................................... 709/202
See application file for complete search history.

(56) References Cited

U.S. PATENT DOCUMENTS

| 9,584,371 | B2 * | 2/2017 | Zhang ................... H04L 41/12 |
| 2008/0189406 | A1 * | 8/2008 | Shen ..................... H04L 29/06 709/224 |
| 2010/0080226 | A1 * | 4/2010 | Khalid ............... H04L 41/5003 370/392 |
| 2012/0051221 | A1 * | 3/2012 | Bui ....................... H04L 45/42 370/235 |
| 2012/0158821 | A1 * | 6/2012 | Barros ................. G06F 16/254 709/203 |

(Continued)

*Primary Examiner* — Kevin T Bates
*Assistant Examiner* — Clarence D McCray
(74) *Attorney, Agent, or Firm* — Foley & Lardner LLP

(57) ABSTRACT

A system includes service management circuitry to dynamically deploy a plurality of service agents in response to dynamic assembly of a corresponding chain of services that each provide different service functionality. The different service functionality can be provided to an operational network device by different respective network devices over a network. The system can include network interface circuitry to transmit the service agents over the network to monitor performance of the respective network devices providing respective services included in the chain of services. The network interface circuitry can receive service performance information from each of the service agents. The performance information can include information indicative of the performance of the respective network devices. The service management circuitry can analyze the received service performance information and manage the chain of services.

17 Claims, 6 Drawing Sheets

(56) References Cited

U.S. PATENT DOCUMENTS

2015/0154039 A1* 6/2015 Zada .................... G06F 9/5011
                                                         718/1
2017/0070425 A1* 3/2017 Mithyantha ............. H04L 45/46

* cited by examiner

NETWORK FUNCTION VIRTUALIZATION MANAGEMENT SYSTEM

PRIORITY CLAIM

This application claims priority to U.S. provisional patent application Ser. No. 62/200,612, filed Aug. 3, 2015, which is entirely incorporated by reference.

TECHNICAL FIELD

This disclosure relates to network function virtualization systems, and more particularly to network function virtualization management systems.

BACKGROUND

The processing power, memory capacity, available disk space, and other resources available to processing systems have increased exponentially. Computing resources have evolved to the point where a single physical server may host many instances of virtual machines and virtualized functions. Each virtual machine typically provides virtualized processors, memory, storage, network connectivity, and other resources. At the same time, high speed data networks have emerged and matured, and now form part of the backbone of what has become indispensable worldwide data connectivity, including connectivity to virtual machine hosts. Improvements in virtualization will drive the further development and deployment of virtualization functionality.

DETAILED DESCRIPTION

Figure 1:
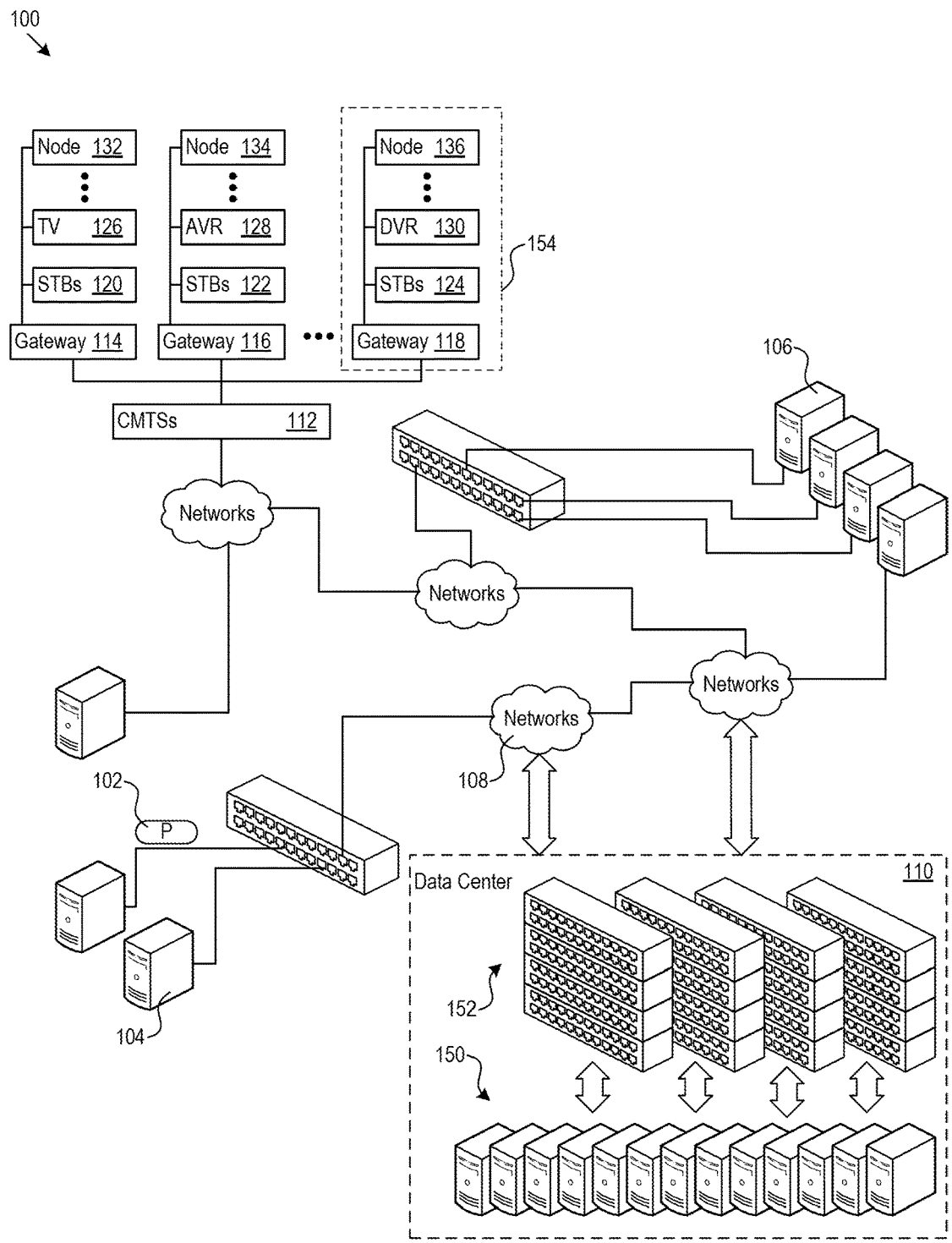
FIG. 1 shows an example of a network that includes virtual machine hosts connected by network devices.

FIG. 1 shows an example network 100. In the network 100, networking devices route packets (e.g., the packet 102) from sources (e.g., the source 104) to destinations (e.g., the destination 106) across any number and type of networks (e.g., the Ethernet/TCP/IP network 108). The networking devices may take many different forms and may be present in any number. The network 108 may span multiple routers and switches, for instance. Examples of network devices include computer servers, switches, bridges, routers, and hubs; however other types of networking devices may also be present throughout the network 100.

The network 100 is not limited to any particular implementation or geographic scope. As just a few examples, the network 100 may represent a private company-wide intranet; a wide-area distribution network for cable or satellite television, Internet access, and audio and video streaming; or a global network (e.g., the Internet) of smaller interconnected networks. In that respect, the data center 110 may represent a highly concentrated server computer installation 150 with attendant network switch and router connectivity 152. The data center 110 may support extremely high volume e-commerce, search engines, cloud storage and cloud services, streaming video or audio services, or any other types of functionality.

In the example in FIG. 1, the network 100 includes operators and providers of services, such as cable or satellite television services, telephony services, and/or Internet services. In that regard, for instance, FIG. 1 shows that the network 100 may include any number of network devices in the form of cable modem termination system (CMTSs) 112. The CMTSs 112 may provide service to any number of gateways, e.g., the gateways 114, 116, 118. The gateways may represent cable modems, combined cable modems and wireless routers, or other types of entry point systems into any of a wide variety of locations 154, such as homes, offices, schools, and government buildings. The network 100 may include other types of termination systems and gateways. For example, the network 100 may include digital subscriber line (DSL) termination systems and DSL modems that function as the entry points into homes, offices, or other locations.

At any given location, a gateway may connect to any number or any type of node, which are network devices. In the example of FIG. 1, the nodes include set top boxes (STBs), e.g., the STBs 120, 122, 124. Other examples of nodes include network connected smart TVs 126, audio/video receivers 128, digital video recorders (DVRs) 130, streaming media players 132, gaming systems 134, computer systems 136, and physical media (e.g., Blu-Ray®) players, and/or any other form of media device. The nodes may represent network devices that are any type of customer premises equipment (CPE).

Figure 2:
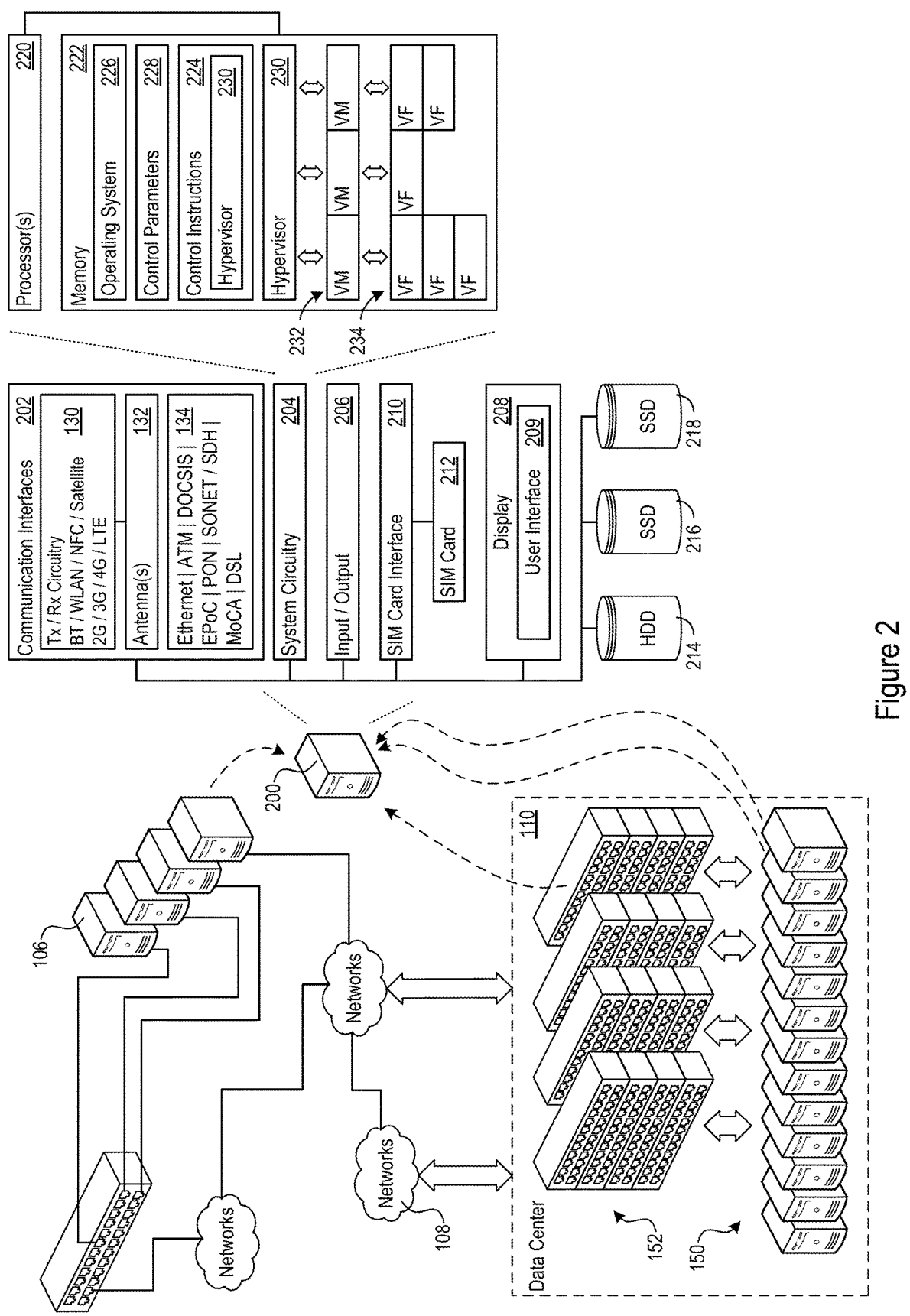
FIG. 2 shows an example of a virtual machine host configured to execute virtual machines and virtual functions.

FIG. 2 shows an example of a virtual machine host 200 ("host") configured to execute virtual machines and virtual functions in the form of services. Any of the network devices in the network 100 may be hosts, including the nodes, gateways, CMTSs, switches, server computers, sources, and destinations. As used herein, such network devices may be described as "service network devices" since such network devices provide virtual services to another network device. The hosts provide an environment in which any selected functionality may run, may be reachable through the network 100, and may form all or part of a chain of functionality or services to accomplish any defined processing or content delivery task. The functionality may be virtual in the sense that, for example, the virtual functions may be implemented, as hardware that includes execution of software instances running on the hosts, functions or services that were in the past executed with dedicated hardware or software at an operational network device.

In FIG. 2, the host 200 includes one or more communication interfaces 202, system circuitry 204, input/output interfaces 206, and a display 208 on which the host 200 can generate a user interface 209. When the communication interfaces 202 support cellular connectivity, the host 200 may also include a SIM card interface 210 and a SIM card 212. The host(s) 200 can also include storage devices, such as hard disk drives 214 (HDDs) and/or solid state disk drives 216, 218 (SDDs).

The user interface 209 and the input/output interfaces 206 may include a graphical user interface (GUI), touch sensitive display, voice or facial recognition inputs, buttons, switches, speakers and other user interface elements. Additional examples of the input/output interfaces 206 include microphones, video and still image cameras, headset and microphone input/output jacks, Universal Serial Bus (USB) connectors, memory card slots, and other types of inputs. The input/output interfaces 206 may further include magnetic or optical media interfaces (e.g., a CDROM or DVD drive), serial and parallel bus interfaces, and keyboard and mouse interfaces.

The system circuitry 204 may include any combination of hardware, software, firmware, or other logic. The system circuitry 204 may be implemented, for example, with one or more systems on a chip (SoC), application specific integrated circuits (ASIC), discrete analog and digital circuits, and other circuitry. The system circuitry 204 is part of the implementation of any desired functionality in the host 200. In that regard, the system circuitry 204 may include circuitry that facilitates, as just a few examples, running virtual machines, running virtual functions, routing packets between the virtual machines and the network 100, and switching packets between virtual machines.

As an example, the system circuitry 204 may include one or more processors 220 and memories 222. The memory 222 and storage devices 214, 216 store, for example, control instructions 224 and an operating system 226. The processor 220 executes the control instructions 224 and the operating system 226 to carry out at least a portion of any desired functionality for the host 200. The control parameters 228 provide and specify configuration and operating options for the control instructions 224, operating system 226, and other functionality of the host 200.

In some implementations, the control instructions 224 include at least some functionality of a hypervisor 230. The hypervisor 230 also includes circuitry that provides hardware operated within a supervising environment to execute one or more virtual machines (VMs), virtual switches, virtual firewalls, virtual operating systems, virtual network interface cards (NICs), or any other desired virtualization components operable as different services for one or more operational network devices. In other implementations, the host 200 is a bare-metal virtualization host. That is, the host 200 need not execute a separate operating system 226 on top of which the hypervisor 230 operates. Instead, the hypervisor 230 may directly communicate with and control the physical hardware resources in the host 200 without supervision or intervention through a separate operating system.

The host 200 may execute any number of VMs 232. Each VM may execute any number or type of virtual functions (VFs) 234, which are instantiated on an operational network device. The VFs may be implementations of any desired functionality, ranging, for instance, from highly specialized network functions to general purpose processing functions.

As just a few examples of network functions or services, the VFs 234 may include circuitry implementing network firewalls, messaging spam filters, and network address translators. As other examples of processing functions or services, the VFs may implement audio and video encoders and transcoders, digital rights management (DRM) processing, database lookups, e-commerce transaction processing (e.g., billing and payment), web-hosting, content management, context driven advertising, and security processing such as High-bandwidth Digital Content Protection (HDCP) and Digital Transmission Content Protection (DTCP-IP) processing. Additional examples of VFs include audio, video, and image compression and decompression, such as H.264, MPG, and MP4 compression and decompression; audio and video pre- and post-processing, server computer functionality such as video on demand server computer(s), DVR server computer(s); over the top (OTT) server computer(s); secure key storage, generation, and application; and 2D and 3D graphics rendering.

Figure 3:
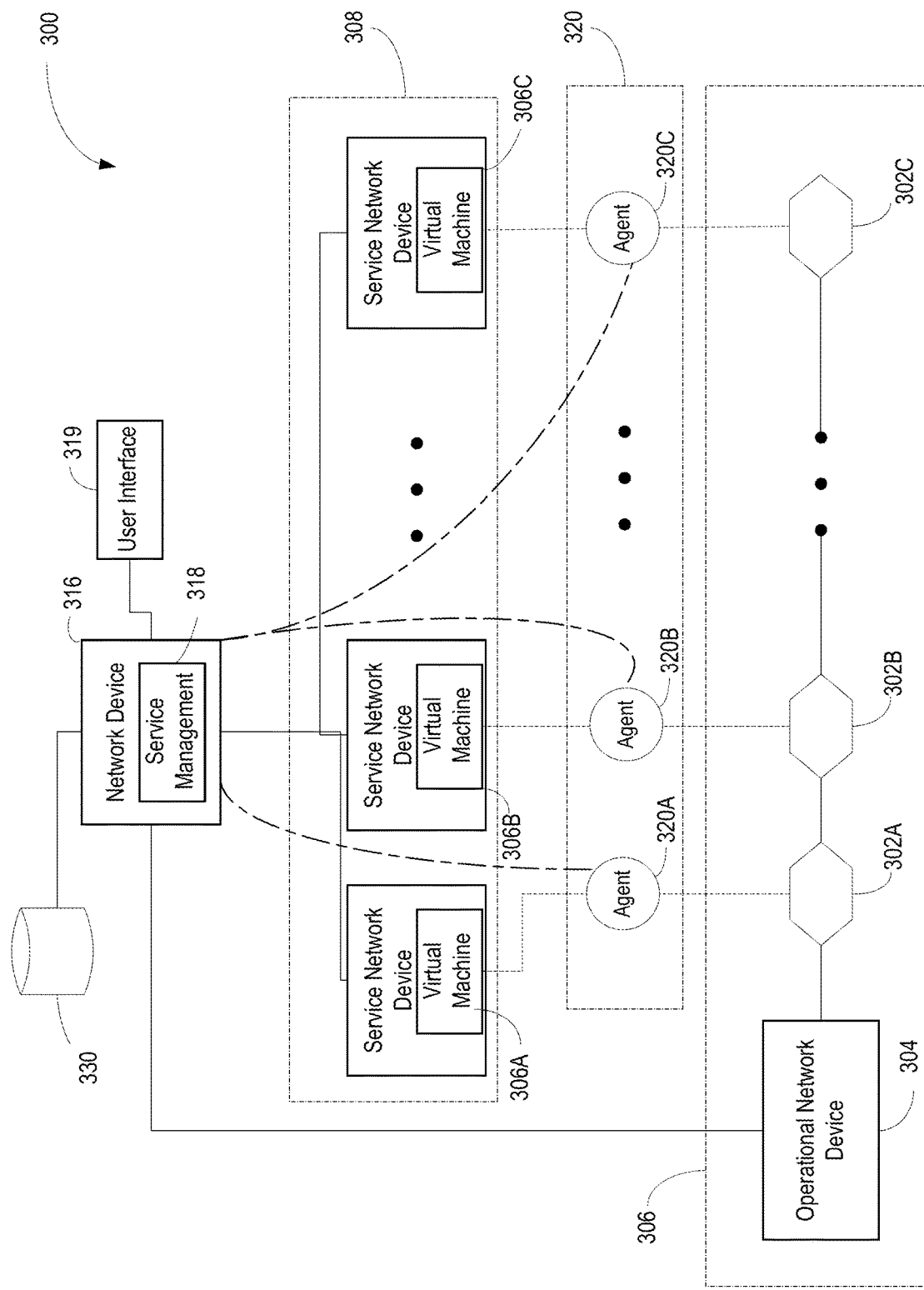
FIG. 3 is a block diagram of a network implementing a system having a number of virtualized services in a network device.

FIG. 3 is a block diagram of a network 300 implementing a system having a number of virtualized services 302 in an operational network device 304. As used herein, the terms "operational network device" are used to identify a network device in which one or more virtualized services 302 are implemented to provide operational functionality of the network device 304. In FIG. 3, the services 302 and the operational network device 304 are included in a dotted line box to illustrate that the services 302 cooperatively operate in the operational network device 304 to provide functionality of the operational network device 304 as a virtualized network device 306. For example, a first service 302A may provide firewall functionality for the operational network device 304, a second service 302B may provide decoding functionality for a first protocol, such as video processing, within the operational network device 304, and a third service 302C may provide decoding functionality for a second protocol, such as audio decoding, within the operational network device 304.

The services 302 may be chained within the operational network device 304 to form a federation of services that cooperatively operate in the operational network device 304 to provide the functionality of the operational network device 304 without the operational network device 304 having to host and execute each of the services 302. Accordingly, resources within the operational network device 304 can be less than what would be available to execute dedicated resident services. In addition, different services can be dynamically instantiated in the operational network device 304 in accordance with the operational demands of the operational network device 304. For example, if the operational network device 304 is decoding only audio, the third service 302C, such as for audio decoding, may be instantiated and operational, whereas the second service 302B, such as for video decoding, can be omitted from the service chain. As used herein, a federation of services is a group of virtual functions or services that cooperatively operate to provide functionality in an operational network device.

The different services instantiated in the operational network device 304 may be provided by one or more virtual machines (VMs) 306 operating on one or more service network devices 308 in the network. Although the example services illustrated in FIG. 3 are depicted as each being provided by a different service network device 306, in other examples, a singled service network device 306 may provide a number of different services by instantiating a number of different virtual machines. In addition, the services being provided may include a number of different functions where each function provides a portion of a particular service, that when cooperatively operating provide the entire particular service. In some examples, multiple virtual machines may be instantiated in the same or different service network devices 306 for each of multiple functions that cooperatively operate to provide a single service.

The service network devices 308 can be characterized as being present in a lower layer, or first layer of the system. One or more other network devices 316 may be included in an upper layer, or second layer of the system to perform a managerial function. The managerial network device(s) 316 may include system circuitry that can be referred to as service management circuitry 318. The service management circuitry 318 can include a processor and memory and other hardware, such as the previously discussed hypervisor circuitry, which can provide provisioning, oversight and dynamic management of the system. In that regard, the service management network device(s) 316 may include a user interface 319, such as one or more of I/O port(s), display(s), touch screen(s), keyboard(s) and/or pointing device(s) capabilities, to allow for control and/or administration of the service management circuitry 318. For example, parameter entry, manual provisioning of services, and/or various other commands, updates, tasks, and/or data entry may be performed by a user via the user interface. In addition, the service management circuitry 318 can dynamically manage provisioning of a chain of services for a given service network device 304. Further, the service management circuitry 318 can provide dynamic infrastructure analysis and management to optimize operation, verify performance and confirm virtualized services are being provided to meet predetermined criteria.

In this way, the service management circuitry 318 can provide whole network visibility to provide a complete end-to-end view of the network implementation of a chain of services. In addition, dynamic provision of additional services and/or dynamic implementation of different service configurations within a chain of services can be monitored and managed based on the complete end-to-end view. Dynamic adaptation of a chain of services may be initiated and/or managed by the service management circuitry 318 to meet predetermined criteria such as class of service (CoS), service level agreements (SLA), quality of service (QoS) or other desired performance metrics. CoS generally refers to parameters used in data and voice communication protocols which are used to differentiate between payload types so that, for example, different priorities, or access levels can be assigned to different groups of users. QoS refers to parameters reflecting overall performance, such as the performance experienced by groups of users of a network. A service level agreement is typically provided as part of a service contract for communication services that generally provides parameters related to quality, scope and responsibility between parties to the agreement.

Since the service management circuitry 318 can dynamically manage a chain of services for any number of operational network devices 306 or groups of users, virtualized services can by dynamically provided to support a given predetermined criteria, such as a given CoS, given QoS parameters and/or given SLA parameters. The service management circuitry 318 can provide a federation of virtualized services to meet pre-defined Classes of Service by managing the definition and delivery of virtualized services/networks that result in a predetermined CoS. The chain of services may be dynamically created and/or modified by the service management circuitry 318 to meet parameters of a class of services such as best-effort services, for instance, or voice-class services, or video-class services.

The service management circuitry 318 may also apply one or more different communication policies in addition to supporting a predetermined performance criteria, such as security, high resiliency through load balancing or best-effort failure. For example, virtual services can be provisioned in service classes to form a chain of trust at a predetermined trust level in accordance with a predetermined security criteria. In another example, a suite of services can be implemented and then tested using the service management circuitry 318 to confirm access and performance of desired functions. In addition, the service management circuitry 318 can dynamically modify, bring in, or add, virtual services to support a given CoS, based on, for example, the test data that are run through the suite of services to characterize the services in terms of their ability to support a given CoS. Alternatively, predetermined criteria, or any other parameters may be used to dynamically modify virtual services to support a given CoS. In addition, the service management circuitry 318 can manage chains of service based on QOS parameters and SLA parameters such that services are dynamically added, modified, dropped and replaced in accordance with QOS parameters and SLA parameters.

For example, network traffic management may be used by the service management circuitry 318 to ensure the functions of an operational network device have an appropriate rate limit for traffic, and/or have sufficient bandwidth allocated so the chain of services can cooperatively operate to meet predetermined criteria, such as an SLA. In this way, the service management circuitry 318 may provide a mechanism to verify that the virtualized network meets CoS/SLA/QoS goals. The service management circuitry 318 can measure and/or dynamically adjust latencies, connectivity, operational status, bandwidth utilization, packet loss, jitter, available bandwidth, and the like. If a service network device 308 is identified as being unable to meet the predetermined criteria, such as an SLA/QoS, the service management circuitry 318 can evaluate and/or effect a move of the service being provided by a service network device 308 to another service network device 308 with capability of meeting the predetermined criteria. Alternatively or in addition, a service or function of a service provided by a virtual machine, such as virtual machine 306A can be dynamically moved to another virtual machine, such as virtual machine 306B by the service management circuitry 318. Similarly, service network devices 308 providing services in a chain of service can be re-allocated to optimize operation of the network devices. For example, at night the service management circuitry 318 can dynamically adjust the chain of services to keep services included in the chain on one server computer of a service network device 308, however, as more users come online in the morning and utilization increases, the service management circuitry 318 may dynamically re-allocate the services in the service chain to offload some services to other virtual machines 306, service network devices 308, or server computers in order to continue to meet the predetermined criteria, such as SLA/QoS goals.

The service management circuitry 318 can provision and/or dynamically assemble and adjust a chain of services in accordance with the needs of an operational network device 306. Alternatively or in addition, the service management circuitry 318 may be provide assembly information regarding a chain of services, and subsequently provide instructions to further assemble and/or adjust the chain of services based on the assembly information received. For example, one of or other network device, such as the operational network device(s) 304 or the service network devices 306 may dynamically assemble a chain of services and provide assembled chain information to the service management circuitry 318 identifying the services and the corresponding operational and services network devices providing functionality for the chain of services. Also, other network devices, such as the operational network device(s) 304 or the service network devices 306 may provide adjustment information related to a chain of services to the service management circuitry 318 for use in dynamically provisioning, dynamically assembling and/or dynamically adjusting a chain of services.

Discovery of the service(s) that are to be used in the virtualized network device 306 may be performed by the service management circuitry 318 based on predetermined services information stored in the data storage 330. Such information may provide the details of the services being dynamically instantiated in the virtualized network device 306. In addition, parameters related to different configurations of the virtual services being dynamically instantiated in the virtualized network device 306 can be stored as predetermined services information. Alternatively, or in addition, the managerial network device 316 may communicate with the operational network device(s) 304 and/or the service network device(s) 308 to discover the service(s) being dynamically deployed and the corresponding predetermined services information for the chain of services.

The service management circuitry 318 can also provide whole network visibility to monitor the services included in a chain of services. Whole network visibility can be provided by the service management circuitry 318 using service agents 320. The service management circuitry 318 can dynamically generate and deploy service agents 320 in accordance with a particular chain of services and the availability of network devices to support the service agents 320. The service agents 320 can be dynamically deployed by the service management circuitry 318 in response to assembly of, and/or changes in, a corresponding chain of services. Each service in the chain of services can provide different service functionality, which can be provided to an operational network device 304 by different respective service network devices 308 over a network. For example, virtual machine 306A can provide a first service that is monitored by a first service agent 320A, which is deployed by the service management circuitry to monitor the first service, after the first service is instantiated on the virtualized network device 306 by the virtual machine 306A. Similarly, in this example, a second service agent 320B can monitor a second service being provided by the virtual machine 306B, and an nth service agent 320C can monitor an nth service being provided by virtual machine 306C.

The service agents 320 can be transmitted over the network to monitor performance of the respective service network devices 308 which are providing the respective services included in the chain of services. Once deployed, each of the service agents 320 can transmit service performance information to the service management circuitry 318. The service performance information is indicative of the performance of the respective service network devices 308. The service management circuitry 318 can receive and analyze the service performance information and manage the chain of services.

The service agents 320 may be dynamically deployed by the service management circuitry 318 on any network device. For example, service agents for respective services may be deployed to the computer server(s) upon which the respective virtual machines 306 are instantiated and executing the respective services. Alternatively, in order to avoid impacting operational performance, such as processing speed, the service agents 320 can be deployed to another network device, such as a network interface controller (NIC) included in the computer server(s) upon which the respective virtual machines 306 are instantiated, or another network device. In another alternative, the service agents 320 may be deployed to a switch or router network device in close proximity to the computer server(s) upon which the respective virtual machines 306 are instantiated in order to monitor performance.

Dynamic selection of the service agents 320 and selection of the network device to which a respective service agent 320 can be deployed may be performed by the service management circuitry 318 based on the chain of services. One or more services which are instantiated in the operational network device 304, such as decoding to enable the streaming of video, can be dynamically discovered using the service management circuitry 318. Alternatively, or in addition, other network devices, such as the operational network device 304 and/or the service network devices 306 may operate (individually or cooperatively) to provide the service chain assembly information or service chain change information to the service management circuitry 318. In addition, operational capabilities of the network devices may be discovered by the service management circuitry 318.

Different classes of services agents 320 may be stored in a data storage 330, such as a database stored in memory. For example, there can be a different service agents 320 stored for each of the respective services, or functions within a service, so that a different class of service aware agents are available to monitor parameters for each of the respective services in a service chain. Alternatively, or in addition, a class of service aware agents may be capable of monitoring more than one respective service where different services have overlapping parameters that are to be monitored to ascertain performance. Thus, the service management circuitry 318 can dynamically select different classes of service aware service agents 320 for deployment that correspond to the different respective services included the service chain.

In addition to a class selection based on the respective service for which the service agent 320 is being deployed, selection of service agents 320 may be based on a type of monitoring to be performed. In some situations, a reporting type of service aware service agent may be deployed that can collect and provide various operational parameters related to the respective service to the service management circuitry 318. In other situations, an evaluating type of service aware service agent may be deployed that collects and analyzes operational parameters and provides the service management circuitry 318 with performance information for a respective service in the form of analysis and recommendations. There can be any number of different types of service agents in a respective class of service agents in accordance with the service and the different types of monitoring being performed.

Selection of the network device to which the service aware service agents 320 are to be deployed may be based on the type of the service aware service agent selected. The service management circuitry 318 may consider operational parameters of prospective network devices such as processing capability, memory storage, current loading, average and peak service traffic flow rates, jitter, latency, security/trust, communication bandwidth, and/or any other parameter related to operation of the deployed agent in selecting a prospective network device to which a service aware service agent shall be deployed. Alternatively, or in addition, operational parameters of prospective network devices, such as current or expected power consumption of a prospective network device—either as a separate parameter(s) or as parameters dependent on a particular service may be used in the agent deployment decision. Also, the number virtual machines presently being supported by agents on a prospective network device, latency of a prospective network device, and other operational related considerations may be used as selection criteria.

In addition, network proximity of prospective network devices to the virtual machine upon which the service is instantiated may be considered by the service management circuitry 318 in deployment of service aware service agents. Alternatively, operational capabilities, such as processing capability, communication protocol availability, and the like of a prospective network device to which a service agent is to be deployed may be used to select a type of service aware service agent to deploy. For example, where a network device with relatively low processing capability, such as 50 MIPs, or relatively high usage by other applications is the deployment target for a service agent, the reporting type of service aware service agent may be selected, whereas with a relatively high processing capability network devices, such as 500K MIPS device, the evaluating type of service aware service agent may be deployed.

The service aware service agents 320 may be temporarily instantiated in the network device to which it is deployed. For example, one or more application program interfaces (APIs) may be available in the network device to dynamically instantiate the agent, and also dynamically eliminate the agent when the agent is no longer needed due to, for example, changes in the change of services. Thus, while a service is included in a chain of services, a deployed service agent may execute and provide performance information. As the chain of services dynamically changes, and a respective service is dynamically removed from the chain of services, a corresponding service agent may be dynamically removed from the network device upon which it was temporarily instantiated. The service management circuitry 318 can also dynamically initiate generation and deployment of a new agent in response to a new service being added to the chain of services.

Figure 4:
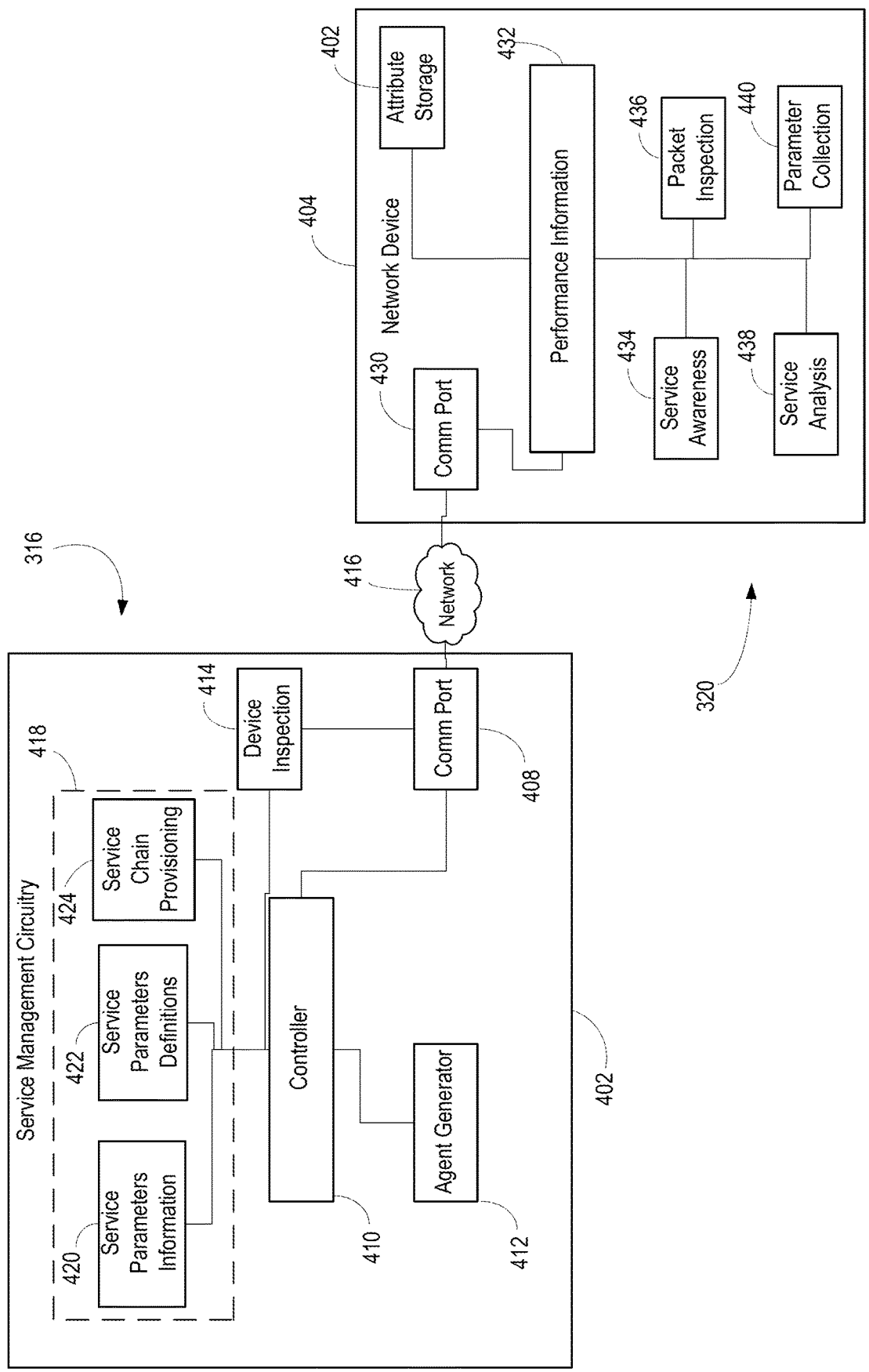
FIG. 4 is a block diagram illustrating an example of a managerial network device and a network device on which a service agent is instantiated.

FIG. 4 is a block diagram illustrating an example of a managerial network device 402 and an agent network device 404 on which a service agent 320 is instantiated. The managerial network device 402 includes service management circuitry 316 represented by communication port circuitry 408, controller circuitry 410, agent generator circuitry 412, and device inspection circuitry 414. In other examples, the functionality of the service management circuitry 414 described herein may be described with fewer or greater numbers of different operational circuitry.

The communication port circuitry 408 can be any form of communication circuitry that provides communication over a network 416. The communication port circuitry 408 provides an interface that is a connection to a network 416. Accordingly, the communication port circuitry 408 can be part of a network interface controller (NIC) or other similar device.

The controller circuitry 410 is configured to manage a dynamically changing chain of services using the communication port 408. The chain of services can include a number of different services being provided by different service network devices over the network to an operational network device upon which the services are dynamically instantiated. The controller circuitry 410 can also monitor and manage different services in a chain of services and dynamically move or change a service as conditions vary. For example, upon the controller circuitry 410 receiving operational information from a service agent that a service network device hosting a virtual machine that operates a transcoding service is operating at too low of a rate based on a threshold parameter such as an SLA parameter, the service can be dynamically moved by the controller 410 from one virtual machine to another. Thus, the controller circuitry 410 can access service related information 418 as part of the analysis.

The service related information 418 can include service parameters information 420, service parameter definitions 422, and service chain provisioning information 424. The service parameters information 420 may provide to the controller 410 operational activity information for a particular service, such as nature and types of communication, expected packet throughput, packet header service identifiers, or any other information that can be used to identify a service. In addition, the service parameter information may provide the type of cooperative operational activity to be expected from a particular service in view of the other services in the chain of services. Thus, for different chain of services configurations, different service parameters information may be provided.

In addition, the controller 410 can access the service parameter definitions 422, which may include description of CoS, QoS, or SLA related parameters used to evaluate the service being monitored. Service parameter definitions may include threshold parameters such as communication thresholds for latency, bandwidth, connectivity, and jitter that comply with a CoS, QoS, and/or SLA. Thus, there can be any number of different service parameter definitions used by the controller 410 depending on the particular service, and the particular user, or group of users.

The controller 410 may also be involved in provisioning or setting up a chain of services using service chaining provisioning information 424. The service chaining provisioning information 424 can include identification of different service network devices from which virtual machines can be executed to provide particular services, or functions, for an operational network device. Such service chaining provisioning information can be stored as the chain of services is dynamically set up and dynamically changed. The service chaining provisioning information 424 may be accumulated and changed based on activity by the service management circuitry 316, or based on information received by the service management circuitry 316. Information such as power consumption of network devices (either as a separate parameter, or as a parameter dependent on a specific service) may be received, such as from agents monitoring service network devices, and used to provision services. For example, a service implemented on a first service network device may consume X watts or power, whereas the same service implemented on a second service network device may consume Y watts of power. Thus, the system can deploy and/or re-arrange services to minimize the overall power consumption of the service network devices in the network. Such services deployments/re-arrangements may involve freeing up and turning off some network devices, and/or minimizing power consumption based on a selective distribution of services over service network devices.

The controller 410 may also provide a diagnostic and reporting function. For example, the controller 410 can perform a particular diagnostic based on a user command to diagnostically review one or more services among a chain of services, or an entire chain of services for one or more operational network devices. The results of the diagnostic review may be provided in the form of a report. Alternatively, or in addition, the controller 410 may provide a reporting function that provides reporting or alarming of non-complaint operation of one or more services, or chains of service when predetermined goals are not maintained. Alternatively, or in addition, the controller 410 can dynamically attempt to adjust parameters, services and/or network devices in response to non-compliant operation, and provide a report of such adjustments, which can also indicate before and after operational performance.

The controller circuitry 410 also controls operation of the agent generator 412 to generate service agents of different classes for the chain of services. The agent generator circuitry 412 is configured to generate service agents. Each of the agents is generated for a corresponding one of the different services (or functions in a given service) in accordance with a network device to which the agent will be deployed. Once deployed and instantiated on a network device, the service function aware service agent can measure service function of only the service(s) for which it was deployed. Thus, generation of a class of service agents for a particular service involves providing the class of agents with knowledge of what to expect from the service. As such, the agent generator is provided with service parameters information 420 by the controller 410 for a particular service to generate service function aware service agents. For example, the service parameter information may include attributes of communication flow characteristics. In the example of a transcoder service from MPEG 4 to MPEG 2, for example, the communication flow characteristics may describe the number of packets flowing into the service are greater than the number of packets flowing out of the service due to the transcoding performed by the service.

As another example attribute of communication flow characteristics, latency parameters can be provided. For example, in the case of a transcoder service, the time between when packets are received by a service and the time when corresponding transcoded packets are sent/emerge from the service could be monitored and used as an indicator of expected operational performance by comparison to predetermined anticipated latency values. Still another example attribute of communication flow can be packet drops, which the generated agent may use as an indicator of expected operation, such as by using a threshold to identify excessive packet drops. In still other examples of communication flow characteristics, average and peak source traffic rates, traffic burstiness of the source, and other traffic related parameters may be monitored and used as indicators of changes in performance by comparison of monitored parameters to trends, historical averages, predetermined thresholds or other such comparison parameters. Also, examples of service characteristics can include priority queue parameters, packet latency, and/or other such parameters used to identify the service, and/or expected operation of the service. Further, attributes of communication flow characteristics can include firewall monitoring results, such as a firewall that monitors/counts communication packets and reports statistics. In other examples, any other parameters or thresholds could be used to identify a service and related functionality, and the overall operational performance/health of a particular service.

In addition, the agent generator 412 may be provided with service parameter definitions 422 by the controller 410 to include in the agent being generated. Service parameter definitions may be used in evaluating service agents to determine compliance with contractual obligations. In addition, or alternatively, alarms or other forms of indications may be generated using service parameter definitions. Included service parameter definitions may describe CoS, QoS, or SLA related parameters used by the agent to evaluate the service being monitored. Service parameter definitions may also include thresholds such as communication thresholds for latency, bandwidth, connectivity, and jitter that comply with a CoS, QoS, or SLA.

The agent generator 412 may also provide the service agent being generated with service chaining provisioning information 424. The service agents may include service chaining provisioning information to allow service agents for different services to be aware of other services and/or service agents. Awareness of other services and other service agents may allow for communication among the network devices. Such communication allows cooperation between different network devices, or in the same network device to meet and maintain service parameter definitions. For example, when two services are operating on the same server computer, the service agent for a first service may dynamically reallocate/coordinate resources of the server computer to a second service when the service agent of the first service recognizes, or is otherwise made aware, that the second service is under heavier demand than the first service. For example, unused buffer queue space allocated to the first service may be dynamically and temporarily allocated to the second service during heavy buffer storage by the second service. Also, the agents of the first and second services may coordinate parameter settings, such as parity settings or burst duration delay to optimize operation. In another example, service agents instantiated on different network devices which are similarly executing to provide monitoring of functions of the same service can dynamically coordinate resource allocation among the different devices. Further, the controller 410 may be manually initiated to generate and deploy additional service agents or replacement service agents for a service or function, including specification of a type of agent desired, such as to increase granularity of analysis of a service by deploying a service agent with increased monitoring capability, processing capability and/or analysis capability.

Upon deployment of a service agent, deployed service agent circuitry 426 may manage and control the deployed service agent. Thus, as the chain of services, or individual services dynamically change, the deployed service agent circuitry 426 may decide whether upgrade/changes or cancellation of a deployed service agent is warranted. Accordingly, the deployed service agent circuitry may decide to replace an existing service agent with a newly generated service agent. Alternatively, service agent circuitry 426 may transmit updates, such as updated parameters to an existing deployed service agent in response to changes in a service or a chain of service. The deployed service agent circuitry 426 can also transmit instructions over the network to cancel a deployed service agent when the chain of services has changed to the point of eliminating a service from the chain. Cancellation of a deployed service agent may also be instructed by the deployed service agent circuitry 426 prior to deployment of a new replacement service agent.

The controller circuitry 410 can also enable the device inspection circuitry 414 to discover the hardware resources of network devices eligible for deployment of a service agent. The device inspection circuitry can identify available network devices, such as by multicasting or broadcasting over the network, and then follow up with interrogation of discovered network devices to determine not only hardware capabilities and available idle capacity of the respective device, but also relative network location with respect to the service network devices participating in supporting services included in a chain of services. Discovered information may be stored and used to determine the type of agent to generate from a class of service agents available for a given service network device.

The agent network device 404 on which a service agent 320 is temporarily instantiated can include communication port circuitry 430 and performance information circuitry 432. The agent network device 404 can be the server computer hosting the virtual machine providing the service, a network interface controller (NIC), or a network device in close network proximity to the service network device providing the service. The service agent may be instantiated on a NIC, or another network device to avoid any impact due to operation of the service agent on the operational performance of the service network device providing the service. The communication port circuitry 430 can communicate with the service management circuitry 318 over the network, such as over a side band channel or other separate communication channel that does not interfere with operation of the service being provided by the service network device.

The performance information circuitry 432 may generate service performance information to communication over the communication port circuitry 430. Depending on the type of service agent instantiated, the performance information circuitry 432 may provide measured parameters (reporting service agent) to the service management circuitry 316 or analysis results (evaluating service agent) via the communication port circuitry 430. In a given class of agents for a particular service, any number of different service agents may be included, such as to support different chain of services configurations, different complexity levels of monitoring being performed, and/or different complexity levels of analysis being performed. In addition, different service agents in a class may be available based on different CoS, QoS, or SLA requirements for a particular operational network device implementing virtual services.

The service agent 320 may also include service awareness circuitry 434 which allows the agent to only monitor the service for which it was generated and deployed. In addition, depending on the type of service agent deployed, the service awareness circuitry 434 may provide functionality to ascertain expected performance of the service network device in providing the virtualized service based on expected performance and operation of the service being provided by the virtual machine instantiated in the service network device. For example, in a given chain of services, or configuration of virtualized services, expected cooperative operation of the monitored service, such as a traffic patterns, may be identified with the service awareness circuitry.

Monitoring of different functions of a service may be based on identification of the different functions or expected activities of the service so that parameters associated with each particular function or activity may be identified and separately monitored. In an example, memory blocks in a shared memory may be allocated to different functions or activities so that the memory blocks may be used to separately identify a virtualized service or functions within a virtualized service. In this example, packets may be dynamically stored in the shared memory and monitored for comparison to determined parameters. Such memory mapping and monitoring may be hardware based or a combination of hardware and software based. In another example, processor operation, such as processor operation for a particular service could be monitored by, for example, monitoring a percentage of the processor cycles being used for a particular service. In still other examples, packet inspection/analysis may also include application (content) related items. For example, for video packets, inspection may include extraction of picture size, coding type, resolution, frame rates, and/or other content or payload related parameters, which may be used to identify services. In other examples, other parameters indicative of expected functions of a service could be used to create service awareness of an agent.

The service agent 320 may also include packet inspection circuitry 436 which is configured to recognize communication packets from the particular service for which the service agent 320 was deployed. In an example, the packet inspection circuitry 436 can do a header inspection to identify a path identifier for packets associated with the respective service for which the service agent was deployed. In another example, packet inspection may match the context of the different packets to identify packets associated with the respective service. In this example, deep packet inspection may be performed on a first packet received to determine a classification such that subsequently received packets can be identified based on the context identified during the deep packet inspection. In other examples, deep packet inspection may be used by the agents for load balancing, such that the agents may balance/reallocate the service or functions of a service among different service network devices, or server computers. Further, cross packet inspection, for example by session re-assembly of collected packets, such as using protocol embedded sequence numbers, may be used to determine, for example, a malicious attack. In still other examples, any other form of packet inspection is possible to identify packets associated with the respective service, or function within a service, for this the service agent 320 was deployed.

The service agent 320 may also optionally include service analysis circuitry 438 which is configured to perform analysis of operation of the respective service. The analysis can be performed in those service agents 320 that are evaluating agents which were generated to include service parameters information, service parameter definitions and chain of service provisioning information. Such analysis may include statistical analysis, such as bit rate variation. In addition, analysis of other parameters, such as packet error rate determination, rate limits, jitter, latency, bandwidth and other CoS, QoS and SLA related parameters may be used in the analysis to perform a comparison with expected service performance. The results of the analysis may be provided to the performance information circuitry 432 for inclusion as performance information.

The service agent 320 may also include parameter collection circuitry 440 which is configured to capture and store parameters related to operation of the respective service. Parameters such as throughput, latency, dropped packets, and jitter may be captured and stored.

Figure 5:
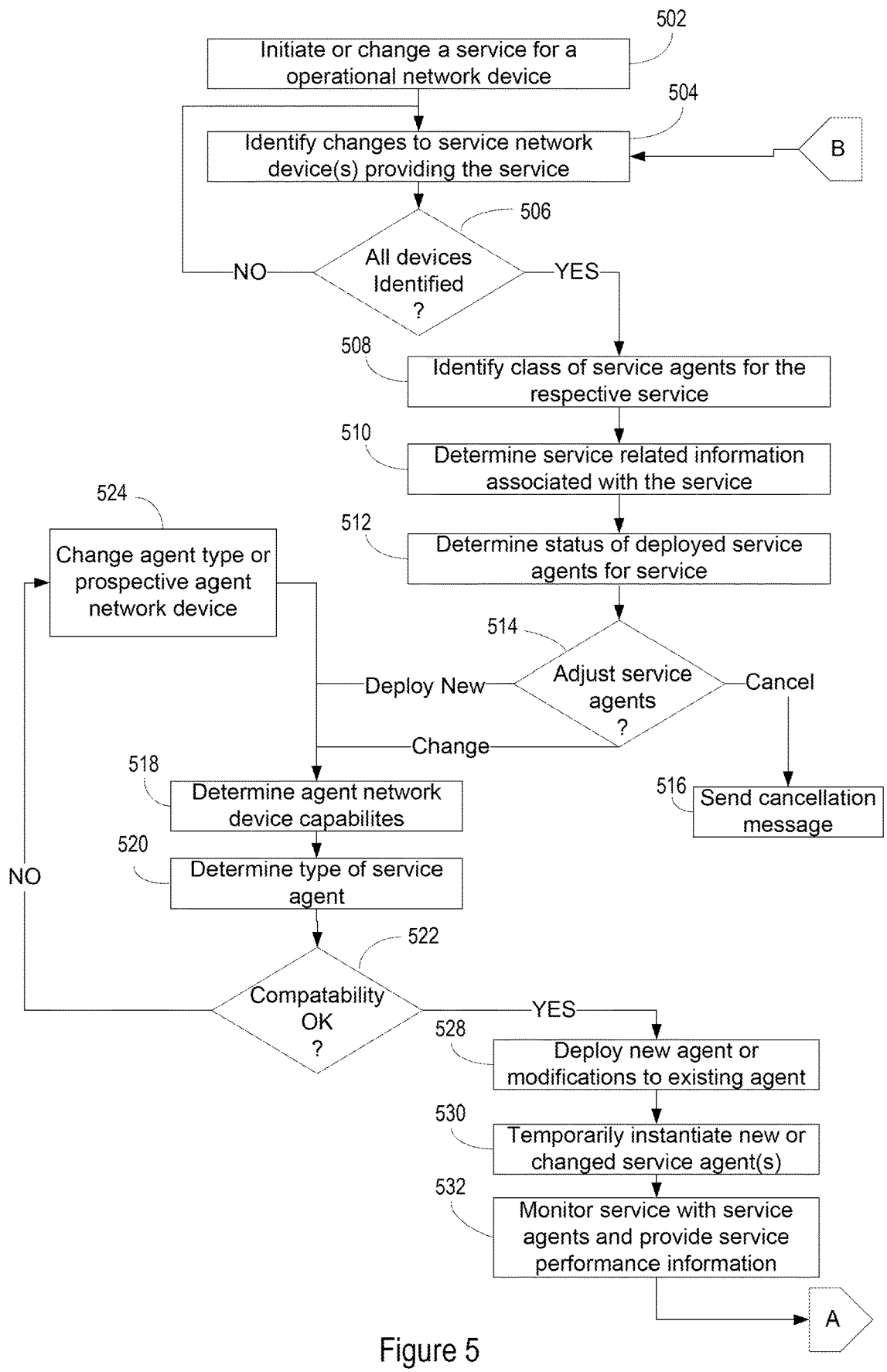
FIG. 5 is an example operational flow diagram illustrating performance of a system implementing monitoring, control and compliance of virtualized services.

FIG. 5 is an example operational flow diagram illustrating performance of a system implementing monitoring, control and compliance of virtualized services. With reference to FIGS. 1-4, an operational network device 304 may perform an operation that includes dynamic initiation or changes to a service. (502) In this example, dynamic initiation or change of a service is described singularly, however, any number of services may be dynamically changed, initiated or stopped during operation of the operational network device 304. In addition, in this description change, initiation and stopping of services are described, it should be recognized that change, initiation and stopping of functions can also be performed. Changes to the service network device(s) 308 supporting a changed or added virtualized service may be identified/recognized. (504) If there are a number of service network devices 308 effected by the changes to a service, each of the effected service network devices 308 supporting the service (or functions within the service) may be identified, until all the associated service network devices effected by the change are identified. (506)

A class of service agents supporting the service that includes one or more different service agents 320 is identified. (508) Service related information associated with the service 418, such as service parameters information 420, service parameter definitions 422 and service chaining provision information 424 is determined for the particular service and the operational network device 304 to which the service is being provided. (510) The status of previously deployed service agents associated with the service is determined. (512) It is determined if additional new services agents should be generated and deployed, or if existing service agents should be cancelled, or if existing service agents should be modified in view of the changes/additions to the service. (514)

If an existing service agent is no longer needed, a cancellation message can be sent to the corresponding agent network device to cancel the instantiation of the existing service agent. (516) Alternatively, the existing service agent can be abandoned since there will no longer be a service to monitor and therefore eventually the service agent can time out due to lack of activity, and be canceled by the agent network device. If a new service agent is to be deployed or is recognized, or an existing agent is to be modified, a determination of capabilities of the prospective agent network device is made. (518) In addition, a type of service agent from the class of service agents for the particular service is determined based on the desired type of monitoring. (520) The new agent, or modifications to an existing agent can be deployed once it is confirmed that the prospective agent network device(s) and the type of service agent are compatible. (522) If there is a compatibility mismatch between the type of service agent and the prospective agent network device(s) (compatibility—no), the operation can either change the type of the service agent to reduce or increase complexity, or identify a different prospective agent network device(s) (524), and again determine prospective agent network device capabilities (518) and a type of the service agent (520) compatibility 522 in accordance with the changes.

The new agent(s) or the changes to the existing agents are generated and deployed when the compatibility is determined to be acceptable. (528) Generation of a new service agent may include populating the new service agent with service chain information, service parameter information, and/or service parameter definitions in accordance with the type of service agent being generated, and the service being monitored. Once the new agent(s) or the changes to the existing agents are deployed, the new service agents and existing service agents with new changes can be temporarily instantiated on the respective prospective agent network devices. (530) The service agents can then begin monitoring the respective agent network devices and providing service performance information over the network to a communication port of the service management circuitry. (532) The service management circuitry can perform analysis of the service performance information in order to monitor connectivity and operation of the different service network devices included in the chain of services. (534) The service performance information can be a report of parameter values captured by the service agents, and/or analysis of monitored parameters in accordance with the type of service agent transmitting the service performance information.

Figure 6:
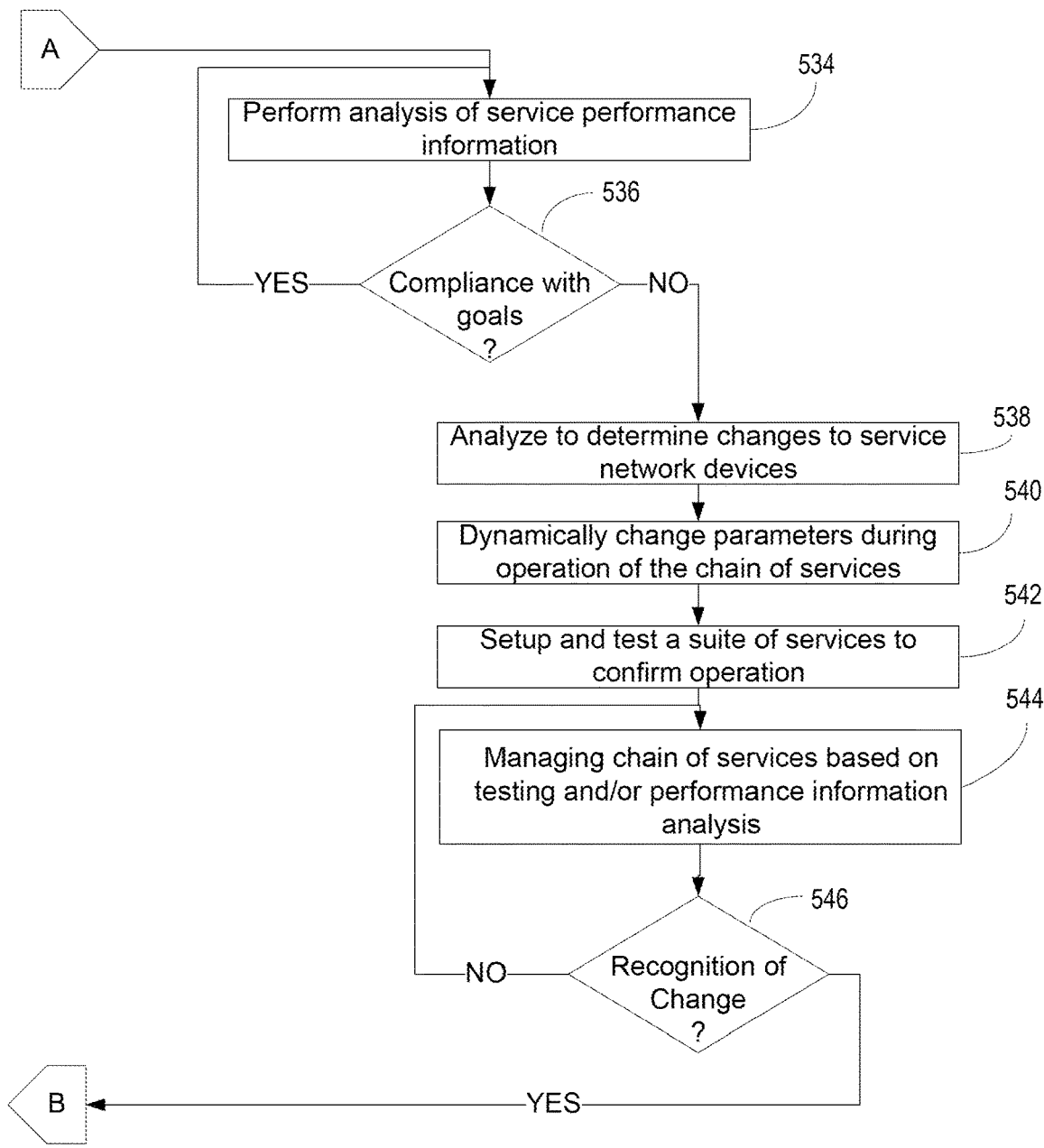
FIG. 6 is an example operational flow diagram illustrating performance of a system implementing monitoring, control and compliance of virtualized services.

It can then be determined if the service is in compliance with predetermined goals based on the analysis of the service performance information. (536) The predetermined goals can involve a CoS, a QoS and/or an SLA, and may be stored in the service parameters information circuitry 420 and/or the service parameters definitions circuitry 422. Referring to FIG. 6, if, based on the analysis of the service performance information, the service is in compliance with the predetermined goals (YES), the operation can continue to perform analysis. (534) If not, the service management circuitry can analyze the service chain provisioning information to determine if changes to the service network devices providing the virtualized services are warranted. (538) Changes can involve changing of operational parameters, changes in device settings, swapping of service network devices, generation of a new service agent, and/or any combination. Dynamic changes to parameters can be made during operation of the chain of services. (540)

In some examples, dynamic changes to parameter values can be verified by setting up and testing a suite of services to confirm successful operation. (542) Testing may be performed to confirm performance of desired functions prior to full deployment in a chain of services. The dynamically assembled chain of services and one or more particular services can be managed by the service management circuitry based on the testing and/or analysis. (544) Management may involve dynamic changes in parameter settings, dynamic addition of services and corresponding service agents, dynamic reallocation of services among service network devices, dynamic reallocation of resources of a particular server computer or agent network device, dynamic changes in the chain of services, and/or any other dynamic adjustments to optimize performance and/or compliance with predetermined goals, such as predetermined operational thresholds associated with a CoS, QoS or SLA. The system may then determine if a change in services has dynamically occurred. (546) If there have been no dynamic changes in services, such as a change caused by a request from the agent network device, the system can continue to manage (544), whereas if a change in the chain of services is detected, the system can return to identify changes to service network device(s) providing the service. (504)

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
service management circuitry configured to, in response to dynamic assembly of a corresponding chain of services that each provide different service functionality, the chain of services comprising a first network device providing a first service:
transmit a request to the first network device from which the first service is being provided for capabilities of the first network device,
receive, from the first network device, a response identifying operational capabilities of the first network device,
select, from within a class of service agents for the service, a first service agent to deploy to monitor the first service with operational capabilities that correspond to the capabilities of the first network device, and
select, from a plurality of network devices, a second network device in proximity to the first network device for deployment of the first service agent, responsive to deployment of the first service agent on the first network device impacting operational performance of the first service on the first network device;
network interface circuitry configured to transmit the first service agent to the second network device over the network to monitor performance of the first network device, the first service agent temporarily instantiated by the second network device responsive to receipt of the first service agent;
wherein the network interface circuitry is further configured to receive service performance information from the first service agent indicative of the performance of the first network device; and
wherein the service management circuitry is configured to analyze the received service performance information and manage the chain of services.

2. The system of claim 1, wherein a respective service agent included among the service agents is temporarily instantiated in a server dynamically providing a respective service included in the chain of services.

3. The system of claim 1, wherein the respective service agent is temporarily instantiated in network interface card included in a server operable as one of network devices providing the respective service.

4. The system of claim 1, wherein a respective service agent included among the service agents is temporarily instantiated in a switch that is in communication with a server dynamically providing a respective service included in the chain of services.

5. A method comprising:
managing a dynamically assembled chain of services provided on an operational network device with service management circuitry, services included in the chain of services being provided over a network to the operational network device by a plurality of service network devices, the chain of services comprising a first network device providing a first service;
transmitting a request to the first network device from which the first service is being provided for capabilities of the first network device;
receiving, from the first network device, a response identifying operational capabilities of the first network device;
selecting, from within a class of service agents for the service, a first service agent to deploy to monitor the first service with operational capabilities that correspond to the capabilities of the first network device;
selecting, from the plurality of service network devices, a second network device in proximity to the first network device for deployment of the first service agent, responsive to deployment of the first service agent on the first network device impacting operational performance of the first service on the first network device;
transmitting the first service agent to the second network device, the first service agent temporarily instantiated by the second network device responsive to receipt of the first service agent to monitor the respective service; and
receiving service performance information from the first service agent indicative of operational performance of the first network device.

6. The method of claim 5, wherein each of the service agents are preconfigured to monitor a different service, and managing the dynamically assembled chain of services comprises identifying each service included in the chain of services and a corresponding service agent capable of monitoring an identified service.

7. The method of claim 5, further comprising recognizing dynamic addition of a new service in the chain of service with the service management circuitry, dynamically identifying a new agent to monitor the new service, and transmitting the identified new agent over the network for instantiation on the corresponding agent network device.

8. The method of claim 5, wherein transmitting each of the identified service agents comprises deploying multiple agents to monitor a same service network device providing multiple different services over the network to the operational network device.

9. The method of claim 8, wherein the multiple agents are configured to communicate to allocate resources of the service network device among the services being provisioned by the service network device.

10. The method of claim 5, further comprising the service management circuitry comparing the service performance information received from the service network devices to performance goals in a service level agreement to determine if the performance requirements are being met.

11. The method of claim 5, wherein dynamically identifying respective service agents for each of at least some services included in the chain of services, further comprises the service management circuitry learning a performance capability of agent network devices available to instantiate the respective service agents, and allocating agents to the agent network devices based on the learned performance capability of the agent network devices.

12. The method of claim 5, wherein transmitting each of the identified service agents to a corresponding agent network device upon which the respective service agents will be instantiated to monitor the respective service the agent network device comprises transmitting at least some of the identified service agents to corresponding service network devices providing a respective service.

13. A system comprising:
a communication port for communication over a network;
service management circuitry configured to manage a dynamically changing chain of services using the communication port, the chain of services being a plurality of different services being provided by different service network devices over the network to an operational network device upon which the services are dynamically instantiated by:
transmitting a request to the operational network device for capabilities of the network device,
receive, from the operational network device, a response identifying operational capabilities of the operational network device, and
select, from within a class of service agents for the service, a plurality of service agents corresponding to the plurality of different services provided to the operational network device, and
select, from a subset of the plurality of network devices not including the operational network device, one or more agent network devices for deployment of the plurality of service agents, responsive to deployment of the plurality of service agents on the operational network device impacting operational performance of the operational network device; and
agent generator circuitry configured to generate the selected plurality of agents, each of the agents generated for a corresponding one of the different services;
the communication port configured to communicate the generated plurality of agents over the network with the one or more agent network devices, the one or more agent network devices executing the plurality of agents to monitor and provide performance information related to each of the services of the operational network device via the communication port to the service management circuitry; and
the service management circuitry configured to dynamically initiate generation and deployment of a new agent in response to a new service being added to the chain of services.

14. The system of claim 13, wherein the agent generator circuitry is configured to populate the new agent with service chain information and service parameter information for the new service so that the new agent is enabled to monitor for compliance with the service parameter information and communicate with the agent network devices generated and deployed in the network.

15. The system of claim 13, wherein the communication port is configured to communicate over a side band channel with the agent network devices.

16. The system of claim 13, wherein the agent network devices are one of a switch, a server or a network interface card.

17. The system of claim 13, wherein the service management circuitry is configured to provision the services in the chain of services for use by the operational network device, and initiate the agent generator circuitry to dynamically generate the plurality of agents based on the provisioned services to strategically monitor performance of the chain of services.

* * * * *